United States Patent

[11] 3,633,693

[72] Inventors: Marvin E. Garfinkle, Stamford; Robert E. Schmeck, Old Greenwich; Einar W. Tangard, Norwalk, all of Conn.
[21] Appl. No.: 77,125
[22] Filed: Oct. 1, 1970
[45] Patented: Jan. 11, 1972
[73] Assignee: Pitney-Bowes, Inc., Stamford, Conn.

[54] POSTAL SCALE WITH OPTICAL READOUT
6 Claims, 3 Drawing Figs.

[52] U.S. Cl. .................................................. 177/178, 353/40
[51] Int. Cl. .................................................. G01g 23/32
[50] Field of Search .................................................. 177/177, 178; 353/40, 41

[56] References Cited
UNITED STATES PATENTS

| | | | |
|---|---|---|---|
| 3,497,381 | 2/1970 | Teraoka | 177/178 |
| 1,296,710 | 3/1919 | Strubler | 177/178 X |
| 2,286,471 | 6/1942 | Dahl | 353/40 X |
| 2,818,769 | 1/1958 | Williams | 177/178 UX |
| 3,185,229 | 5/1965 | Bell et al. | 177/178 X |
| 3,279,551 | 10/1966 | Gittus | 177/178 |
| 2,322,813 | 6/1943 | Beck | 177/178 X |

Primary Examiner—Stephen J. Tomsky
Assistant Examiner—George H. Miller, Jr.
Attorneys—William D. Soltow, Jr., Albert W. Scribner, Martin D. Wittstein and Louis A. Tirelli ABSTRACT: There is disclosed a postal scale of the type having a housing, a weighing platform atop the housing, and weighing mechanism within the housing including a movable reticle in an optical readout system. The reticle incorporates weight information and is moved through the optical axis of the readout system to project the proper information to the user. The disclosed scale differs from those of the prior art in that the reticle is projected onto the back surface of a screen which also functions as a portion of the scale housing.

PATENTED JAN 11 1972
3,633,693
Fig. 1.
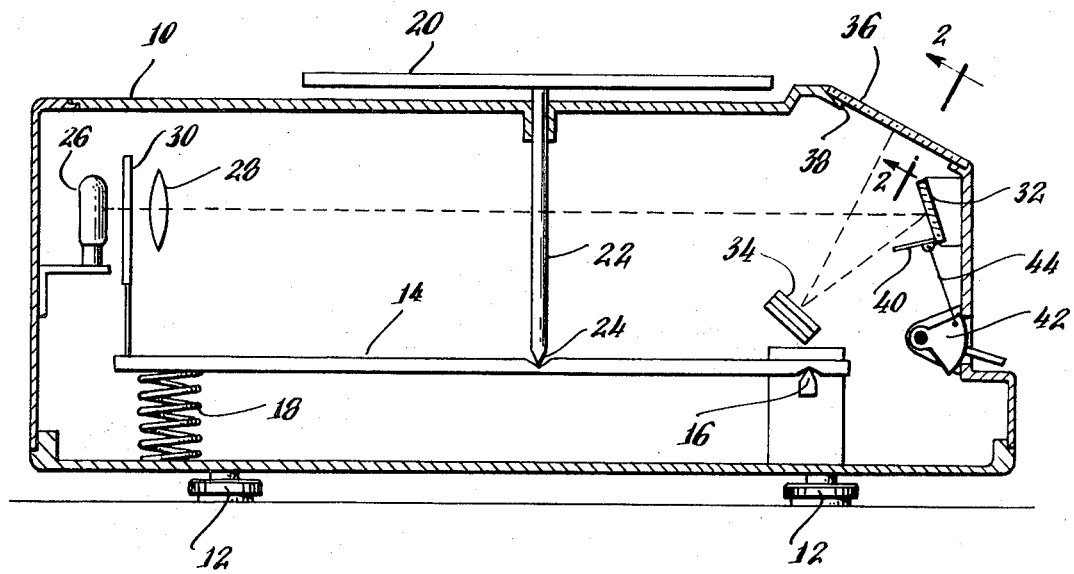
Fig. 2.
Fig. 3.
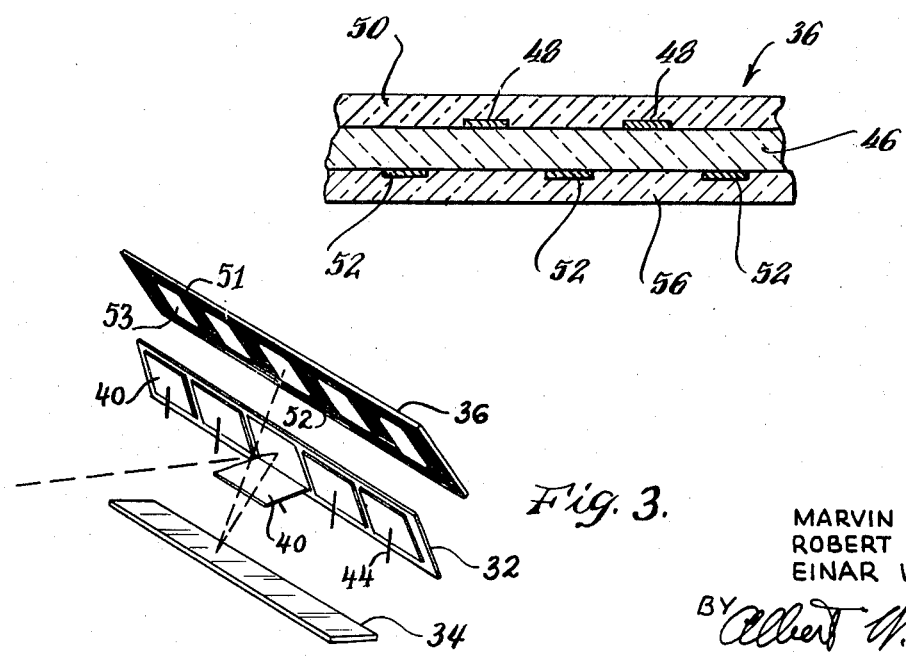
INVENTORS
MARVIN E. GARFINKLE
ROBERT E. SCHMECK
EINAR W. TANGARD
BY Albert W. Scribner
ATTORNEY.

POSTAL SCALE WITH OPTICAL READOUT

BACKGROUND OF THE INVENTION

This invention pertains to postal scales and, more particularly, to such scales which employ an optical readout system. A conventional postal scale known to the prior art includes a light source and a focusing lens with a reticle therebetween. The reticle carries thereon weight information as well as postal rates for the various weights. The reticle is movable with the scale beam in order that the proper portion is presented to the viewer in accordance with the weight placed on the weighing platform. The optical axis is folded by means of properly placed mirrors. In these prior art scales, the final image is projected onto a screen positioned deep within the housing and is viewed by the observer through an opening in the housing. This presents a problem because the viewer must position his eye within a restricted cone formed by the image and the opening in order to view the necessary information. In prior art devices, this is approximately a 15° cone. This requirement substantially reduces the utility of such prior art scales.

It is a primary object of the present invention to provide a scale with an optical readout which may be viewed with substantially the same degree of latitude as in viewing a printed page. Other objects, features, and advantages will be apparent from the following description and appended claims.

SUMMARY OF THE INVENTION

In accordance with the present invention there is provided a scale, including a housing, a weighing platform, balance means supporting the platform, and reticle means movable in response to the balance means. An optical system is provided for projecting an image of the reticle to the user. In the improvement of this invention, a portion of the exterior of the scale housing forms a viewing screen and the optical system projects the image onto the inner surface of the screen.

BRIEF DESCRIPTION OF THE DRAWING

FIG. 1 is a cross section taken through a scale incorporating the improvement of this invention, the weighing mechanism of the scale being illustrated in simplified, partially schematic form;

FIG. 2 is an enlarged cross section taken substantially along the line 2—2 of FIG. 1; and FIG. 3 is a perspective view of the image projection path.

DESCRIPTION OF THE PREFERRED EMBODIMENT

Referring to FIG. 1, there is illustrated a scale incorporating the present invention and comprising a housing 10 resting on suitable feet 12. Within the housing is a balance beam 14 carried by a pivot 16 and supported by a spring 18. A weighing platform 20 is mounted on a movable stem 22 which, in turn, is supported by the balance beam at a pivot point 24. The drawing of FIG. 1 is, of course, highly schematic but illustrates the general elements of a postal scale.

The optical readout portion of the scale comprises a lamp 26 and lens 28. Intermediate the lamp and lens is a reticle 30 supported by, and movable in response to movement of, the balance beam 14. Printed upon this reticle is the weight and price information common to postal scales. The optical axis of lens 28 is "folded" via rectangular mirrors 32, 34 and the reticle image is focused on the inner surface of a viewing screen 36. Screen 36 is mounted in an opening 38 formed in the housing, thereby becoming an integral part of such housing. The screen 36 normally appears opaque and the projected image thereby appears to be presented on the housing itself. This differs from prior art devices wherein the image at the reticle was formed at the location of mirror 34, screen 36 being replaced by a clear window. It will be seen from FIG. 1 that, in view of the distance between an image formed at mirror 34 and the opening 38, the viewing angle was greatly restricted. It was, in fact, necessary to position the eye within substantially a 15° cone in order to view the weight information. This drawback is overcome by the present invention wherein the screen 36 may be viewed from any position in the same manner as a printed page.

Covering the mirror 32 are a plurality of opaque shutters 40, normally spring loaded to lie against the mirror 32. Each shutter, however, may be opened, by any suitable actuating linkage such as the toggle arrangement 42 and the wire 44, to reveal selected portions of the image.

As the amount of light available to form the final image is limited, the usual dead front material often employed for back lighting could not be utilized. Instead, an exceptionally clear base stock is required. The construction of screen 36 is illustrated in greatly enlarged form in FIG. 2. It comprises the exceptionally clear base stock 46 which carries on one surface opaque lettering 48 covered by a protective layer 50. The other surface of the stock carries any required masking 51 and is also provided with a protective layer 56. One of the requirements for the masking 51 is that it have portions 52 which block from operator view the narrow slits of light which are reflected from the gap between the shutters 40 and which otherwise would be visible on screen 36. As shown in FIG. 3, the screen may be further masked in such a way as to provide a plurality of individual viewing areas 53 each of which is of a size no greater and preferably slightly smaller than the effective optical size of the shutters 40 on screen 36, thereby allowing only the desired image to be visible on the said screen. The indicia viewing areas 53 are thereby mutually transversely isolated in a horizontal row. The screen material for the invention is commercially available under the designation "Duralar 500," a trademark of Duralith Corporation, Millville, New Jersey.

It is believed that the many advantages of this invention will be apparent to those skilled in the art. It will also be apparent that a number of variations and modifications may be made in this invention without departing from its spirit and scope. Accordingly, the foregoing description is to be construed to be illustrative only rather than limiting. This invention is limited only by the scope of the following claims.

We claim:

1. In a scale including a housing, a weighing platform, balance means supporting said platform, reticle means movable in response to said balance means, and an optical system for projecting an image of said reticle to the user, the improvement which comprises: a viewing screen forming a portion of the exterior of said housing;
    said viewing screen including a layer of clear material on which is disposed a masking means and an opaque lettering layer together with at least one protective layer, said masking means effectively defining a plurality of individual laterally spaced viewing areas on said screen; and
    means included in said optical system capable of projecting images from said reticle onto the respective viewing areas of said screen.

2. Apparatus as defined by claim 1 wherein selectively operable means are provided for preventing the said projected images from reaching said viewing areas of said screen.

3. Apparatus as defined by claim 1 wherein said projecting means comprises a folded optical system.

4. Apparatus as defined by claim 3 wherein said optical system comprises first and second planar mirrors.

5. Apparatus as defined by claim 1 wherein said masking means and opaque lettering layer are on opposite sides of said layer of clear material.

6. Apparatus as defined by claim 5 wherein protective layers are provided on opposite sides of said clear material.

* * * * *